March 26, 1968  H. A. McMASTER ET AL  3,375,094
METHOD AND APPARATUS FOR SHAPING GLASS OR THE LIKE
ON A CURVED GAS SUPPORT BED
Filed Jan. 11, 1965  3 Sheets-Sheet 1

INVENTORS
Harold A. McMaster,
& Paul J. Reising

Barnard, McGlynn & Reising
ATTORNEYS

INVENTORS
Harold A. McMaster,
& Paul J. Reising

Barnard, McGlynn & Reising
ATTORNEYS

March 26, 1968    H. A. McMASTER ETAL    3,375,094
METHOD AND APPARATUS FOR SHAPING GLASS OR THE LIKE
ON A CURVED GAS SUPPORT BED
Filed Jan. 11, 1965    3 Sheets-Sheet 3
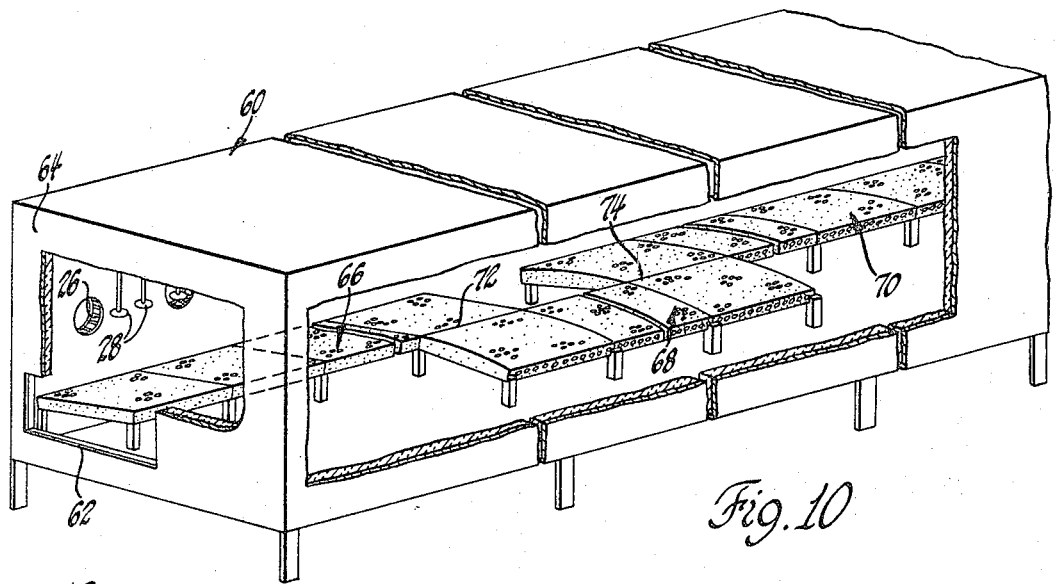
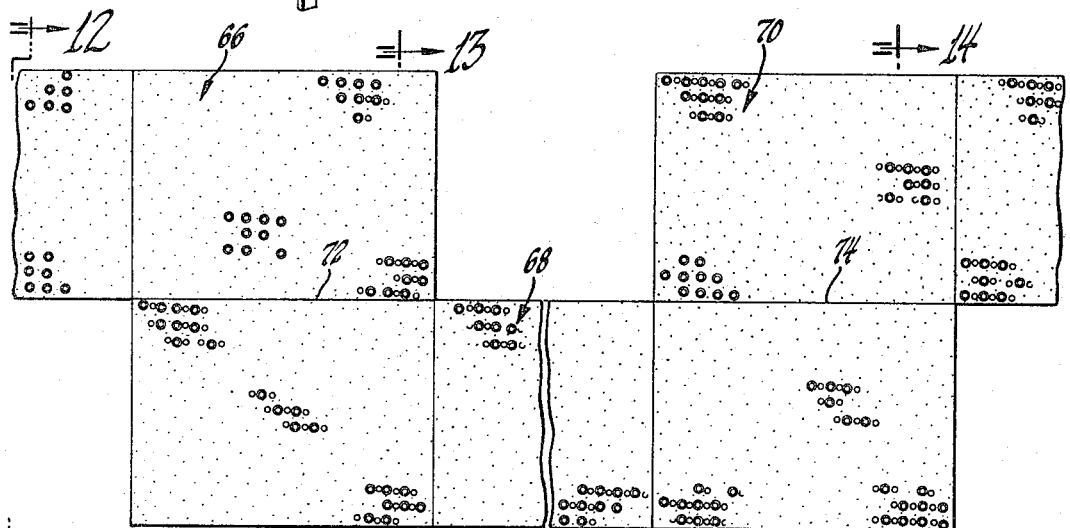
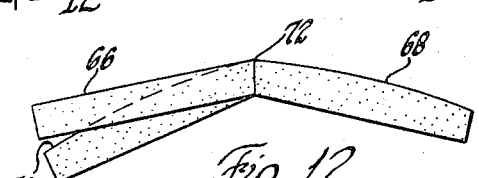
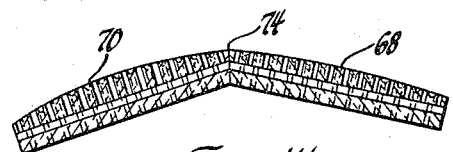
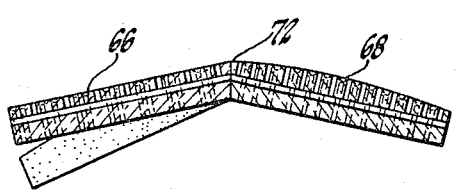
INVENTORS
Harold A. McMaster,
& Paul J. Reising
Barnard, McGlynn & Reising
ATTORNEYS United States Patent Office 3,375,094
Patented Mar. 26, 1968

3,375,094
METHOD AND APPARATUS FOR SHAPING GLASS OR THE LIKE ON A CURVED GAS SUPPORT BED
Harold A. McMaster, Woodville, Ohio, and Paul J. Reising, Birmingham, Mich., assignors to Permaglass Inc., Woodville, Ohio, a corporation of Ohio
Filed Jan. 11, 1965, Ser. No. 424,632
13 Claims. (Cl. 65—25)

ABSTRACT OF THE DISCLOSURE

An apparatus for treating sheets of glass including a furnace with a bed having an elongated flat portion and a curved portion disposed within the furnace. There is also included means for providing a blanket of fluid above the bed for floating respective sheets of glass over the bed. There is also included means adjacent the bed for moving the sheets along the bed as they float thereabove. The curved portion of the bed is disposed in abutting relationship to one side of and adjacent one end of the flat portion with the curved portion being curved in a direction laterally away from the longitudinal axis of the flat portion so that a sheet of glass may move along the flat portion as it is being heated and then moved in a different direction over the curved portion while being curved and then moved in a different direction along the curved portion of the bed.

---

This invention relates to a method and apparatus for manufacturing curved sheets of thermoplastic material and, more particularly, curved tempered glass sheets for automobile windows and the like.

In recent years, there has been a greatly increased demand for tempered curved glass sheets for use as the side and back windows for automobiles, protective screens for television tubes, building windows, and the like. It is an object of the present invention to provide an improved method and apparatus for manufacturing curved glass sheets of high quality and at a low cost on a continuous high-production basis. More specifically, the present invention has as one of its objects the provision of an improved method and apparatus for manufacturing curved glass sheets wherein the individual sheets of glass are heated and allowed to bend to a curved configuration while the glass sheets are floated on hot gas to thereby prevent marring contact of the glass with the apparatus while the glass sheets are in the softened condition.

Briefly, these objects are accomplished in accordance with the invention by an apparatus comprising a perforated bed having an elongated flat portion and a portion extending at an angle, generally a right angle, to the first bed portion and transversely to the longitudinal axis of the flat portion and about an axis generally parallel to and offset from the longitudinal axis of the first portion. Hot gases are emitted from the perforations in the bed so as to create sufficient gas pressure to float the glass sheets over and out of contact with the bed and to heat the glass sheets to their deformation temperature.

In operation, the glass sheets in spaced relationship, one after the other, are transported or guided by a conveyor means along the elongated flat portion of the bed as they are floated on hot gases and heated and then from the elongated flat portion in a direction generally normal thereto over the curved portion of the bed. When each sheet reaches the curved portion of the bed, it has been heated to its softening or deformation temperature. Therefore, as it moves from the end of the flat portion of the bed to the curved portion of the bed, the front edge of each respective sheet drops to follow the curved portion of the bed so that as the sheet is moved over the curved portion of the bed it is curved.

The curved portion of the bed is preferably elongated, the glass sheets being conveyed over the length thereof to give them time to accurately conform to the curved contour thereof. Such an elongated curved portion can be disposed longitudinally beside and parallel to the flat portion so that the sheets over the curved portion of the bed are moving in a direction opposite to the direction traveled along the flat portion of the bed. Conversely, the elongated curved portion of the bed may be disposed so that it extends away from the end of the flat portion of the bed. In the latter instance, the sheets move along the curved portion of the bed in the same general direction as when moving along the flat portion of the bed.

A further embodiment of the invention is useful in those instances where it is necessary to curve the sheets considerably to a degree greater than can be accomplished conveniently by the aforedescribed embodiments. In this further embodiment, the sheets, while being floated and heated, are moved in a first direction over a flat portion of the bed, then at an angle onto and over a first curved portion of the bed and then again at an angle onto and over a second curved portion. The second curved bed portion has a greater degree of curvature than the first curved bed portion and therefore causes the glass sheet to be curved a greater degree than possible by use of the first curved bed portion alone.

Other objects and attendant advantages of this invention will be readily appreciated as the same becomes better understood by reference to the following detailed description when considered in connection with the accompanying drawings wherein:

FIGURE 10 shows a perspective view of yet another embodiment of the present invention with an alternative bed disposition to provide successive steps of curving a sheet of glass;

FIGURE 11 is a plan view of the bed of the embodiment of FIGURE 10;

FIGURE 12 is an end view of the bed of FIGURE 11 taken along line 12—12;

FIGURE 13 is a cross-sectional view of the bed taken along line 13—13 of FIGURE 11; and FIGURE 14 is a cross-sectional view of the bed of FIGURE 11 taken along line 14—14.

Figure 1:
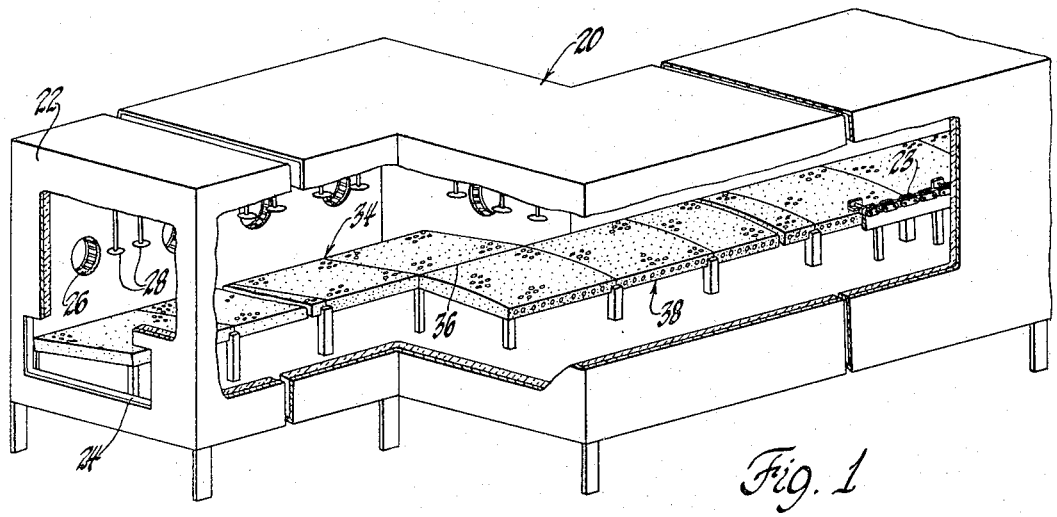
FIGURE 1 shows a perspective view of an embodiment of the present invention.

There is shown in FIGURE 1 an embodiment of the present invention wherein the bed is disposed within a furnace, generally shown at 20. The furnace 20 has end walls, one of which is not shown, and the other shown at 22. The end walls have holes or apertures therein. One such hole 24 is shown in the end wall 22. In the preferred embodiment of the furnace, the bed extends through the hole 24 so that the glass sheets may be conveniently placed over the bed at a loading station and moved along the bed, through the hole 24, and into the furnace. Likewise, the bed may extend through a hole at the opposite end of the furnace so that the glass sheets float through the hole and out of the furnace. A blasthead (not shown) may be positioned adjacent that end of the furnace so that the glass sheets float out of the furnace and into the blasthead for cooling or tempering.

Blowers 26 and heaters 28 are disposed at various positions along the furnace and operate in conjunction with the perforations 30 and 32 along the bed. The blowers 26 circulate gases heated by the burners 28 from the top of the bed through a passage (not shown) to the bottom of the bed so that the gases pass upward through the perforations 30 in the bed to form a blanket of hot gases over the bed to float the glass sheets along the bed. Also, a conveyor, generally indicated at 23, may be disposed in the furnace to contact the individual glass sheets to move them along the bed of the furnace as the sheets float thereabove. Examples of a blasthead, blowers, and heaters which may be used with the instant invention, are more particularly and specifically set forth in United States Patent 3,332,759 in the names of Harold A. McMaster and Norman C. Nitschke and assigned to the assignee of the present invention. Also, examples of particular conveyors which may be utilized in the various embodiments of the present invention are set forth in United States Patent 3,282,447 in the name of Harold A. McMaster and assigned to the assignee of the present invention, and application Ser. No. 424,531, filed Jan. 11, 1965, in the names of Harold A. McMaster and Paul J. Reising and assigned to the assignee of the present invention.

In the embodiment shown in FIGURES 1 through 4, the bed is formed of two portions, one flat portion, generally shown at 34, and the other a curved portion, generally shown at 38. The flat bed portion 34 extends a predetermined length from one end of the furnace, such as from a loading station positioned adjacent the end wall 22. A glass sheet is placed on the bed and supported on a blanket of hot gases supplied by the blowers 26 so that the sheet may be heated as it is moved along the flat portion of the bed. When a glass sheet reaches the end of the flat portion of the bed where it is to change direction to pass over the curved portion of the bed, it must have been heated sufficiently so that as it passes over the curved portion of the bed it will sag under the force of gravity to be curved. The higher the temperature to which a glass sheet is heated the more fluid it becomes so that it more rapidly sags under the force of gravity to become curved. If a sheet of glass becomes too fluid, i.e., approaches its melting point, distortions will occur in the glass as it bends to become curved. To avoid these distortions, the sheet of glass is heated just to that temperature sufficient to allow it to sag under the force of gravity to be curved. At that temperature the sheet will resist the force of gravity urging it to be curved since it will remain somewhat rigid. Once the deformation temperature which has been found suitable for preventing distortions in the glass sheets has been determined, the sheet of glass will be heated to that temperature when it reaches the end of the flat portion of the bed. The heating of the sheet of glass to that temperature over the flat portion of the bed when subjected to hot gases at a particular temperature will take a predetermined period of time. Therefore, three citeria, the temperature to which the glass sheet is to be heated, the temperature of the hot gases heating the glass sheet, and the speed with which the glass sheets are passed over the flat portion of the bed, determine the length of the flat portion of the bed. In other words, with the hot gases at a particular temperature, heating a sheet of glass to a particular deformation temperature while passing over the flat portion of the bed will take a predetermined period of time. Therefore, if the sheet is moved rapidly over the flat portion of the bed, the bed will have to be longer than if the sheet is moved slowly over the flat portion of the bed. In correlation with this factor, a short flat bed portion requiring the glass sheets to move rather slowly thereover will decrease the rapidity with which glass sheets may be sent through the furnace. That is to say, with a long flat bed portion sheets of glass may be floated along the bed rather rapidly with close spacing and reach the desired temperature before passing over the curved section so that a fairly rapid production rate may be attained in the furnace.

The flat portion of the bed 34 is abutted along one side thereof at juncture or abutment 36 with the curved bed portion 38. The curved bed portion 38 is cylindrically curved about its longitudinal axis which is parallel to and offset from the longitudinal axis of the flat portion 34. The glass sheets, having traveled along the flat portion 34 of the bed, will then move at right angles to the direction traveled along the flat portion 34 of the bed to move over the abutment 36 and over the curved portion 38 of the bed. As the glass sheets move from the flat portion 34 of the bed to the curved portion 38 of the bed, they sag due to gravity to conform to the curvature of the curved portion 38 of the bed.

Figure 2:
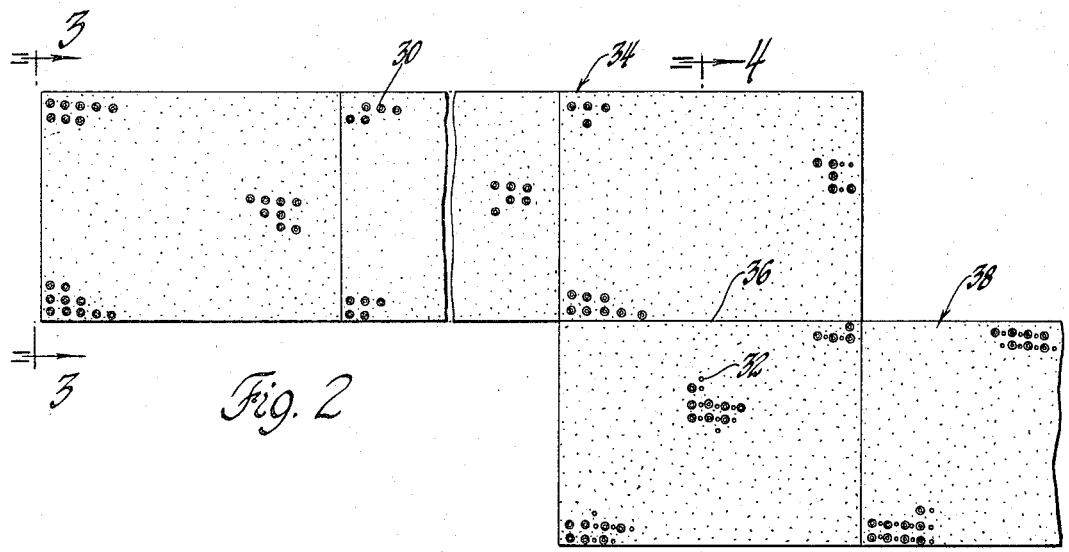
FIGURE 2 shows a plan view of the bed of the embodiment shown in FIGURE 1.
Figure 3:
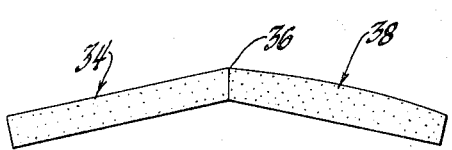
FIGURE 3 shows an end view of the bed of FIGURE 2 taken along line 3—3.
Figure 4:
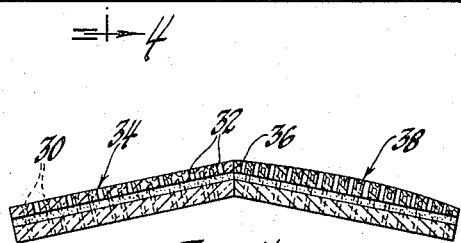
FIGURE 4 shows a cross-sectional view of the bed of FIGURE 2 taken along line 4—4.

FIGURES 3 and 4 more clearly show the relative disposition between the flat portion 34 and the curved portion 38. The curved portion 38 of the bed has a uniform transverse curvature along its length and abuts the flat portion of the bed 34 along one side thereof (i.e., in side by side relationship) at the abutment 36, which is adjacent one end of the flat portion 34. The curvature of the curved portion of the bed is therefore transverse to the longitudinal axis of the flat portion of the bed. The curved bed portion 38 extends in the same general direction as the flat portion 34 of the bed and extends away from the end of the flat portion 34 of the bed. However, if no further heat treating of the sheets of glass is necessary, once the sheet is over the curved portion, the curved portion 38 of the bed need not extend away from the flat portion of the bed so that a sheet of glass may be moved from the flat portion 34 of the bed over abutment 36, over the curved portion of the bed 38, where it sags the desired amount to conform to the degree of curvature of the second portion 38 of the bed, and need not be moved further before entering a blasthead. If the temperature of the glass is sufficient when moved over the curved portion 38, it may be moved directly into a blasthead for tempering. The bed as shown in FIGURES 1 and 2, however, comprises a curved portion 38 which extends a predetermined distance away from the end of the flat portion 34 of the bed. The sheet is moved from the flat portion 34 of the bed over abutment 36 to the curved portion 38 of the bed and then is moved along the curved portion 38 of the bed along a line parallel to and offset from the longitudinal axis of the flat portion 34 and in the same direction it moved over the flat portion 34. As the sheet of glass is moved along the curved portion 38, the temperature of the glass is being raised sufficiently to enable the glass to be passed to a blasthead where it is tempered.

In FIGURES 6 through 9, there is shown an alternative embodiment of the present invention wherein a bed is disposed in a furnace, generally shown at 40. The furnace 40 has a hole or aperture 42 in one end wall 44. A loading station may be abutted to the end wall 44 and the bed may extend into the loading section so that glass sheets may be placed thereon and moved through the hole 42 into the furnace. The embodiment of FIGURE 6 also utilizes a flat bed portion, generally shown at 46, and a cylindrically curved portion, generally shown at 48. The curved portion 48 of the bed extends longitudinally in side by side relationship to the flat portion 46 of the bed. Disposed between the flat portion 46 and the curved portion 48 of the bed is a partition 50 which separates circulating hot gases over the respective bed portions within the furnace.

Figure 6:
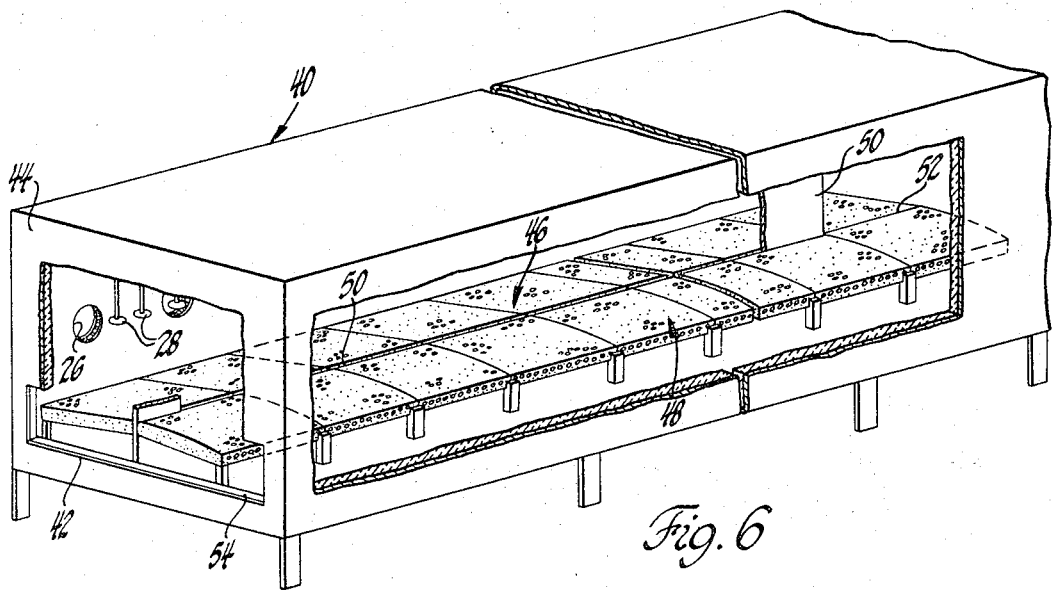
FIGURE 6 shows a perspective view of another embodiment of the present invention with an alternative relative bed disposition.
Figure 7:
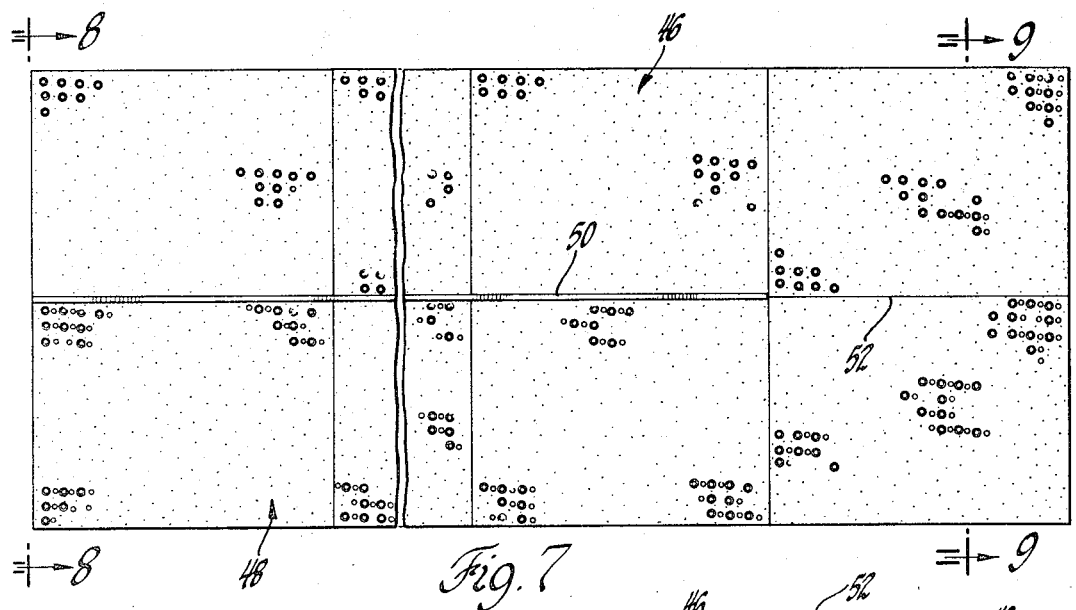
FIGURE 7 shows a plan view of the bed of the embodiment of FIGURE 6.
Figure 8:
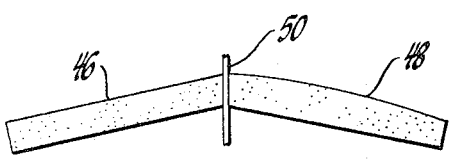
FIGURE 8 shows an end view taken along line 8—8 of FIGURE 7.
Figure 9:
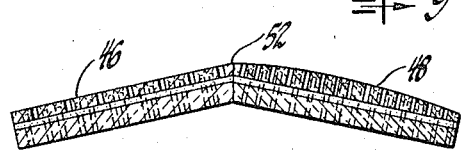
FIGURE 9 is a cross-sectional view taken along line 9—9 of FIGURE 7.

FIGURE 7 shows a plan view of the bed of the embodiment of FIGURE 6 and more clearly shows the partition 50 extending along the furnace to a position adjacent one end of each respective bed portion. At the position adjacent the end of each respective bed portion a glass sheet moves from the flat portion 46 of the bed to the curved portion 48 of the bed. In this position, between the flat portion 46 and the curved portion 48 of the bed where the partition 50 does not extend, the bed portions 46 and 48 abut one another at an abutment 52. The abutment 52 is more clearly shown in FIGURE 9. FIGURE 8 shows the relative disposition of the flat portion 46 with the curved portion 48 and the partition 50.

In the embodiment illustrated in FIGURES 6 through 9, a sheet of glass is placed on a blanket of gases above the flat bed portion 46 at a first end adjacent the hole 42. The sheet then floats over the flat bed portion 46 and is moved to the opposite end of the flat bed portion where it has reached its deformation temperature. The sheet is then moved in a second direction perpendicular to the direction which it traveled over the flat portion of the bed, over the abutment 52 and over the curved bed portion 48. The curved bed portion 48 is cylindrically curved in a direction away from the abutment with the flat portion of the bed and is curved about an axis which is parallel to the longitudinal axis of the flat portion 46. Once the glass has been moved over the curved portion 48 of the bed, it is moved along the curved bed portion 48 along a line parallel to the longitudinal axis of the flat bed portion 46 and in a direction opposite to the direction it moved over the flat portion 46. The sheet is, therefore, moved back to the same end of the furnace where it started. The sheet is then moved through the hole 54 in the end wall 44 of the furnace and into a blasthead. The path, therefore, which a glass sheet moves over the bed in the embodiment illustrated in FIGURES 6 through 9 is a path generally in the shape of a U.

In FIGURES 10 through 14 there is illustrated a third embodiment of the present invention wherein there is shown a furnace, generally at 60. The furnace 60 has holes or apertures in each end wall. One of the holes is shown at 62 in the end wall 64. A loading station may be abutted against the wall 64 of the furnace to move the glass sheets through the hole 62 over the flat portion 66 of the bed. The embodiment shown in FIGURES 10 through 14 utilizes two curved portions 68 and 70. The flat portion 66 of the bed extends in a first direction a predetermined distance to an end where it is disposed along the side of the first curved portion 68. The curved bed portion 68 abuts the flat bed portion 66 in side by side relationship at the abutment 72. The curved bed portion 68 extends in a direction parallel to and offset from the longitudinal axis of the flat bed portion to a position where there is disposed, laterally of the first curved bed portion 68, the second curved bed portion 70. The second curved bed portion 70 may extend away from the end of the first curved bed portion 68, as shown, to provide for movement of a sheet of curved glass therealong for heat treatment. Conversely, the curved portion 70 may not extend away from the end of the curved portion 68, to provide for no movement of a glass sheet therealong, if the glass sheet has reached a temperature sufficient for tempering in a blasthead when it moves to the second curved portion 70. As alluded to previously, a sheet of glass must be heated to a temperature sufficient for it to deform under the force of gravity to take on a curved configuration. However, the temperature of the glass sheet must not be high enough to make the glass fluid which causes optical distortions in the glass. To prevent optical distortions due to over-heating of the glass sheets and yet curve the glass sheet to the degree desired, it may be necessary to utilize two or more curved bed portions, each bed portion being curved to a greater degree than the preceding bed portion.

To clarify the need for two curved portions, assume that a glass sheet passing from the flat bed portion to the curved bed portion has not been heated to a temperature high enough for the glass sheet to deform under the force of gravity to take on a curved configuration. The glass sheet will then remain uncurved as it passes over the curved portion of the bed and the edges of the glass sheet will be farther away from the bed than the middle area. Therefore, the edges will not be supported by the blanket of hot gases to the extent that the middle area of the sheet is being supported. This causes the middle of the glass sheet to approach the curved portion of the bed and may even cause the middle area of the glass sheet to contact the bed. Analogizing, a sheet of glass heated to a temperature sufficient so that it will deform slightly, but not become optically distorted, will resist deforming under the force of gravity. This will cause the edges of the sheet of glass to remain farther away from the bed than the middle area of the sheet. If the degree of curvature in the curved portion of the bed is too great, the heated sheet of glass may not deform rapidly enough and, consequently, may come in contact with the bed along the middle area thereof. To avoid this, a curved bed portion having a lesser degree of curvature is utilized in conjunction with a second curved portion so that the sheet of glass may be passed over the first curved bed portion and sag under the force of gravity to conform to the degree of curvature of the first curved portion of the bed without coming in contact with the bed. The sheet is then passed to the second curved bed portion which has a greater degree of curvature and sags under the force of gravity to take on a higher degree of curvature. Thus, by utilizing one, two, or more successive curved bed portions each having a higher degree of curvature than the preceding curved portion, a sheet of glass may be curved to a high degree while avoiding the possibility of the sheet contacting with the bed due to the fact that it has not been heated to a high enough temperature to allow it to deform fast enough to avoid non-support of the edges of the sheet of glass by the blanket of hot gases.

In the embodiment of FIGURES 10 through 14 a sheet of glass is moved along the flat bed portion 66 to a position laterally of the abutment 72. The sheet is then moved in a second direction, which is perpendicular to the first direction, over the abutment 72 and over the curved portion 68 where it sags to conform to the curvature thereof. The glass sheet is then moved in the same direction it moved over the flat bed portion 66 along a line parallel to and offset from the longitudinal axis of the flat bed portion 66. The sheet is moved along the first curved portion 68 to a position laterally of the abutment 74 between the two curved portions of the bed. Once the sheet has reached the end of the first curved bed portion 68, it is then moved over the abutment 74 and over the second curved bed portion 70 where it sags due to gravity to conform to the curvature thereof to take on yet a higher degree of curvature. The glass sheet is, therefore, curved in successive degrees.

If the desired degree of curvature is not attained by utilizing two successive curved bed portions as utilized in the embodiment of FIGURES 10 through 14, yet another curved portion may be attached laterally of the second curved bed portion 70 so that the glass sheet may be moved along the curved portion 70 and then over a third curved bed portion to assume yet a higher degree of curvature. Regardless of the number of curved bed portions utilized, the glass sheet will normally be moved into a blasthead to be tempered when it has been curved to the desired degree and has reached the desired temperature.

Figure 5:
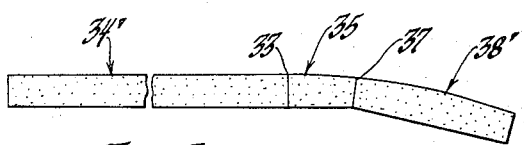
FIGURE 5 shows an end view of an alternative embodiment which utilizes a transition bed portion.

An alternative method of curving respective glass sheets while avoiding possible contact of the respective sheets with the bed, as discussed hereinbefore, is illustrated by the bed configuration of FIGURE 5. This embodiment includes a flat bed portion, generally indicated at 34', and a curved bed portion, generally indicated at 38'. A transition bed portion, generally indicated at 35, is disposed between the flat portion 34' and the curved portion 38'. The transition portion 35 abuts the flat portion 34' along one side thereof at 33 and has an upper surface having an increasing degree of curvature in a direction and transverse to the abutment 33 between the flat and transition portions. The curved portion 38' abuts the transition portion 35 along one side thereof and has an upper cylindrically curved surface which curves in a direction and transverse to the abutments 37, between the curved and transition portions, and 33 between the flat and transition portions. A sheet of glass may be floated along the flat portion 34' to a position where it is moved in a direction at 90° the direction it moved along the flat portion to move over the transition portion where it may conform to an increasing degree of curvature as it moves thereover. The sheet, after passing over the transition portion, then moves in the same direction over the curved portion where it may conform to a cylindrical curve.

In each of the embodiments illustrated in the drawings, the first curved bed portion of the bed, whether it be a transition portion or a cylindrically curved portion, is disposed in abutting relationship with one side of the flat bed portion adjacent one end of the flat bed portion. Consequently, a glass sheet moves along the flat portion while its temperature is being raised to the desired deformation temperature so that it may then be moved in a second direction, which is perpendicular to the direction moved along the flat portion, from the flat portion over the curved portion. The sheet conforms to the curved upper surface of the curved bed portion, whether gradually increasing in the degree of curvature or having a constant degree of cylindrical curvature, which curves in a direction which is transverse to and extends away from the abutment between the flat and curved portions, which is also transverse to and laterally away from the longitudinal axis of the flat portion. The invention involves different positioning of the curved portion of the bed relative to the flat portion depending upon whether a sheet of glass is to be heated further once it is curved, in which case it is moved along the curved portion instead of directly into a blasthead. If the glass sheet is to be moved along an extended curved bed portion for additional heating, it moves along a line parallel to and offset from the longitudinal axis of the flat bed portion, but it may travel in the same direction or in the opposite direction to the direction it traveled over the flat bed portion. Although the invention has been illustrated and described in connection with curved bed portions having cylindrical surfaces it will be understood that the curved bed need not have a cylindrical curvature since various curved shapes may be utilized. However, the curvature in the curved portion of the bed is about some axis (or series of axes) which is parallel to and offset from the longitudinal axis of the flat portion of the bed. This does not mean, however, that the curvature must be cylindrical about such an axis; instead, it means that the transverse curvature of the curved portion of the bed is constant along an axis which is parallel to the abutment between the two bed portions and parallel to and offset from the longitudinal axis of the flat bed portion. Although the curved surface need not be cylindrical it is curved in a direction which is transverse to and extends away from the longitudinal axis of the flat bed portion and is curved about some axis which is parallel to and offset from the longitudinal axis of the flat bed portion.

It is to be noted that in each of the embodiments illustrated the first curved bed portion is in a position so that the curvature extends laterally away from the longitudinal axis of the flat bed portion at an angle of 90° measured in a horizontal plane. However, the curved portion of the bed may be disposed relative to the flat portion of the bed so that a glass sheet, when moving from the flat bed portion to the curved bed portion, does not move in a direction which is 90° with the longitudinal axis of the flat bed portion of the bed. For example, in the embodiment illustrated in FIGURE 1 the flat bed portion 34 and the curved bed portion 38 can be disposed relative to one another so that their respective longitudinal axes are not quite parallel. In such an embodiment, a rectangular sheet of glass may be moved over the flat bed portion with one of its edges parallel to the longitudinal axis of the flat bed portion and then over the curved portion where the glass sheet would be curved about an axis not parallel to any of its edges.

While the invention has been described in its preferred embodiments, it is to be understood that the terminology used herein is intended to be in the nature of words of description rather than words of limitation.

Obviously, many modifications and variations of the present invention are possible in light of the above teachings. It is, therefore, to be understood that within the scope of the appended claims the invention may be practiced otherwise than has been specifically described.

We claim:
1. In an apparatus for treating sheet material by at least partially supporting the sheet on gases over a bed while heating the sheet and moving the sheet thereover, the improvement comprising: a bed having a first elongated portion and a second portion abutting each other in a side by side relationship; said first portion of said bed having a flat upper surface; and said second portion of said bed having a surface curved in a direction which is transverse to and extends generally away from the longitudinal axis of said first portion said second portion being curved about an axis which is offset from the longitudinal axis of said first portion.

2. An apparatus for treating sheets of material comprising: a bed having an elongated flat portion, a transition portion and a cylindrically curved portion; means for providing a blanket of fluid above said bed for respective sheets of material to float upon and for heating the sheets; means adjacent said bed for moving said sheets along said bed portions as said sheets float thereabove, said transition portion of said bed being disposed in abutting relationship to one side of and adjacent one end of said flat portion; said transition portion having an increasing degree of curvature in a direction which is transverse to and extends laterally away from the longitudinal axis of said flat portion; and said cylindrically curved portion being disposed in abutting relationship with said transition portion and curving in a direction which is transverse to and extends laterally away from the longitudinal axis of said flat portion whereby a sheet of material may be moved in a first direction over said flat portion to a position adjacent said transition portion and then moved in a second direction over said transition and cylindrically curved portions respectively; said curved portion being curved about an axis which is offset from the longitudinal axis of said flat portion.

3. An apparatus for treating sheets of glass comprising: a furnace; a bed having an elongated flat portion and a curved portion supported within said furnace; means in fluid communication with said bed for providing a blanket of fluid above said bed for respective glass sheets to float upon and for heating the sheets; means adjacent said bed for moving glass sheets along said bed portions as said sheets float thereabove; said curved portion of said bed being disposed in abutting relationship to one side of said flat portion adjacent one end thereof; and said curved portion having a curved upper surface curving in a direction which is transverse to and extends laterally away from the longitudinal axis of said flat portion; said curved portion being curved about an axis which is offset from the longitudinal axis of said flat portion.

4. An apparatus as set forth in claim 3 wherein said curved portion of said bed extends in a direction parallel the longitudinal axis of said flat portion to allow a sheet of glass to move in a first direction along said flat portion of said bed, then to move in a second direction perpendicular to said first direction from said flat portion to said curved portion of said bed while bending, then to move along said curved portion of said bed in a third direction along a line parallel the longitudinal axis of said flat portion.

5. An apparatus as set forth in claim 4 wherein said third direction is opposite to said first direction.

6. An apparatus as set forth in claim 4 wherein said third direction is the same as said first direction.

7. An apparatus as set forth in claim 6 including: a third bed portion abutting said curved bed portion in side by side relationship, said third bed portion being curved in a direction laterally away from said curved portion whereby a sheet of glass may be moved in said third direction along said curved portion, then in a fourth direction perpendicular to said third direction to move over said third portion.

8. An apparatus as set forth in claim 7 wherein said third portion has a greater degree of curvature than said first-mentioned curved portion.

9. An apparatus for treating sheets of glass comprising: a furnace; a bed supported within said furnace including an elongated flat portion, a transition portion, and a cylindrically curved portion; means in fluid communication with said bed for providing a blanket of fluid above said bed for respective sheets of glass to float upon and for heating the sheets; means adjacent said bed for moving sheets of glass along said bed portions as said sheets float thereabove; said transition portion of said bed being disposed in abutting relationship to one side of and adjacent one end of said flat portion and having an increasing degree of curvature in a direction which is transverse to and extends laterally away form the longitudinal axis of said flat portion; and said cylindrically curved portion disposed in abutting relationship to one side of said transition portion so as to curve in a direction which is transverse to and extends laterally away from the longitudinal axis of said flat portion whereby a sheet of glass may float along said flat portion in a first direction and then float in a second direction over said transition and cylindrically curved portions respectively; said transition portion and said cylindrically curved portion being curved about an axis which is offset from the longitudinal axis of said flat portion.

10. In a furnace for treating sheets of glass wherein sheets of glass are moved along a bed on a blanket of hot gases so that said sheets are heated to deformation temperature so as to conform to the contour of the bed, the improvement comprising: a bed having an elongated flat portion and a curved portion; said curved portion disposed in abutting and side by side relationship with said flat portion; and said curved portion being curved about an axis which is parallel to and offset from the longitudinal axis of said flat portion whereby the curvature of said curved portion extends in a direction which is transverse to and laterally away from said flat portion thereby to allow a sheet of glass to be floated on a blanket of hot gases along said flat portion in a first direction, then floated in a second direction perpendicular to said first direction over said curved portion.

11. A method for curving sheets of glass comprising the steps of; supporting the sheet on gas, heating the sheet to a temperature at which the sheet is soft, conveying the sheet in a first direction over a flat gas support bed, conveying the sheet in a second direction which is transverse to said first direction, curving the sheet about an axis which is transverse to said second direction as the sheet is conveyed in said second direction, and cooling the sheet.

12. A method for curving sheets of glass comprising the steps of: supporting the sheet on gas; heating the sheet to a temperature at which the sheet is soft; conveying the sheet in a first direction over a flat gas support bed; conveying the sheet in a second direction, which is perpendicular to said first direction, to move the sheet from said flat bed to a curved bed which is curved in a direction transverse to the longitudinal axis of said flat bed and about an axis parallel to and offset from the longitudinal axis of said flat bed; and cooling the curved sheet.

13. The method as set forth in claim 12 including the steps of: conveying the sheet in a third direction and along said curved bed; conveying the sheet before cooling thereof in a fourth direction, which is perpendicular to said third direction, to move the sheet over a second curved bed which has a greater degree of curvature than the first mentioned curved bed.

References Cited

UNITED STATES PATENTS

| | | | |
|---|---|---|---|
| 3,223,501 | 12/1965 | Fredley et al. | 65—25 |
| 3,291,590 | 12/1966 | McMaster | 65—25 |

DONALL H. SYLVESTER, *Primary Examiner.*

A. D. KELLOGG, *Assistant Examiner.*

UNITED STATES PATENT OFFICE
CERTIFICATE OF CORRECTION

Patent No. 3,375,094                               March 26, 1968

Harold A. McMaster et al.

It is certified that error appears in the above identified patent and that said Letters Patent are hereby corrected as shown below:

Column 1, line 55, after "and" insert -- curved --; line 57, "and to" should read -- to and --. Column 3, line 68, "citeria" should read -- criteria --. Column 7, line 10, after "direction" insert -- away from --; line 14, after "direction" insert -- away from --. Column 9, line 40, "form" should read -- from --.

Signed and sealed this 16th day of September 1969.

(SEAL)
Attest:

Edward M. Fletcher, Jr.                           WILLIAM E. SCHUYLER, JR.
Attesting Officer                                       Commissioner of Patents